United States Patent
Edelmeier et al.

(10) Patent No.: US 10,813,181 B2
(45) Date of Patent: Oct. 20, 2020

(54) VEHICLE CONTROL DEVICE AND CONTROLLING LIGHTS

(71) Applicant: HELLA KGaA and Company, Lippstadt (DE)

(72) Inventors: Ralf Edelmeier, Herzebrock-Clarholz (DE); Thomas Franz Fark, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 571 days.

(21) Appl. No.: 13/827,171

(22) Filed: Mar. 14, 2013

(65) Prior Publication Data

US 2014/0265838 A1 Sep. 18, 2014

(51) Int. Cl.
*H05B 45/10* (2020.01)
*B60Q 1/14* (2006.01)

(52) U.S. Cl.
CPC .............. *H05B 45/10* (2020.01); *B60Q 1/14* (2013.01)

(58) Field of Classification Search
CPC .............. H05B 33/086; H05B 33/0866; H05B 33/0848; H05B 33/0845; H05B 33/0854; H05B 45/10; B60Q 3/0253; B60Q 3/0259; B60Q 1/14; B60Q 2300/054; B60Q 2300/056; B60Q 2300/112; B60Q 2300/114; B60Q 2300/116; B60Q 2300/122; B60Q 2300/134; B60Q 2300/142; B60Q 2300/144; B60Q 2300/21; B60Q 2300/312; B60Q 2300/314; B60Q 2300/32; B60Q 2300/322; B60Q 2300/332; B60Q 2300/3321; B60Q 2300/333; B60Q 2300/334; B60Q 2300/337; B60Q 2300/41; B60Q 2300/42; B60Q 1/076; B60Q 1/085; B60Q 1/1415; B60Q 1/143; B60Q 1/18; B60Q 1/26; B60Q 1/305; B60Q 1/323; B60Q 1/44; B60Q 3/001; B60Q 3/0279; B60Q 3/0286; B60Q 3/0296; B60Q 3/048; B60Q 6003/0293
USPC ............ 315/297, 307, 200 R, 210, 294, 151, 315/185 R, 224, 186, 201, 291, 152, 192, 315/247, 250, 193, 206, 77, 82, 83
See application file for complete search history.

(56) References Cited

U.S. PATENT DOCUMENTS

| | | | |
|---|---|---|---|
| 7,868,563 B2 * | 1/2011 | Ito | H05B 33/08 315/299 |
| 8,698,427 B2 * | 4/2014 | Dari et al. | 315/308 |
| 9,013,105 B2 * | 4/2015 | Ohkura | B60Q 11/005 315/82 |
| 2005/0043907 A1 * | 2/2005 | Eckel et al. | 702/62 |
| 2008/0204053 A1 * | 8/2008 | Grebner | H05B 45/37 324/706 |

* cited by examiner

*Primary Examiner* — Borna Alaeddini
(74) *Attorney, Agent, or Firm* — Husch Blackwell LLP

(57) ABSTRACT

A control device for lights having at least one input wherein a coded resistor can be connected to the input, and having at least one input wherein a passive temperature sensor 20a, 20c, particularly a PTC or an NTC, can be connected to the same. The invention also relates to an arrangement of such a control device and at least one light.

5 Claims, 1 Drawing Sheet

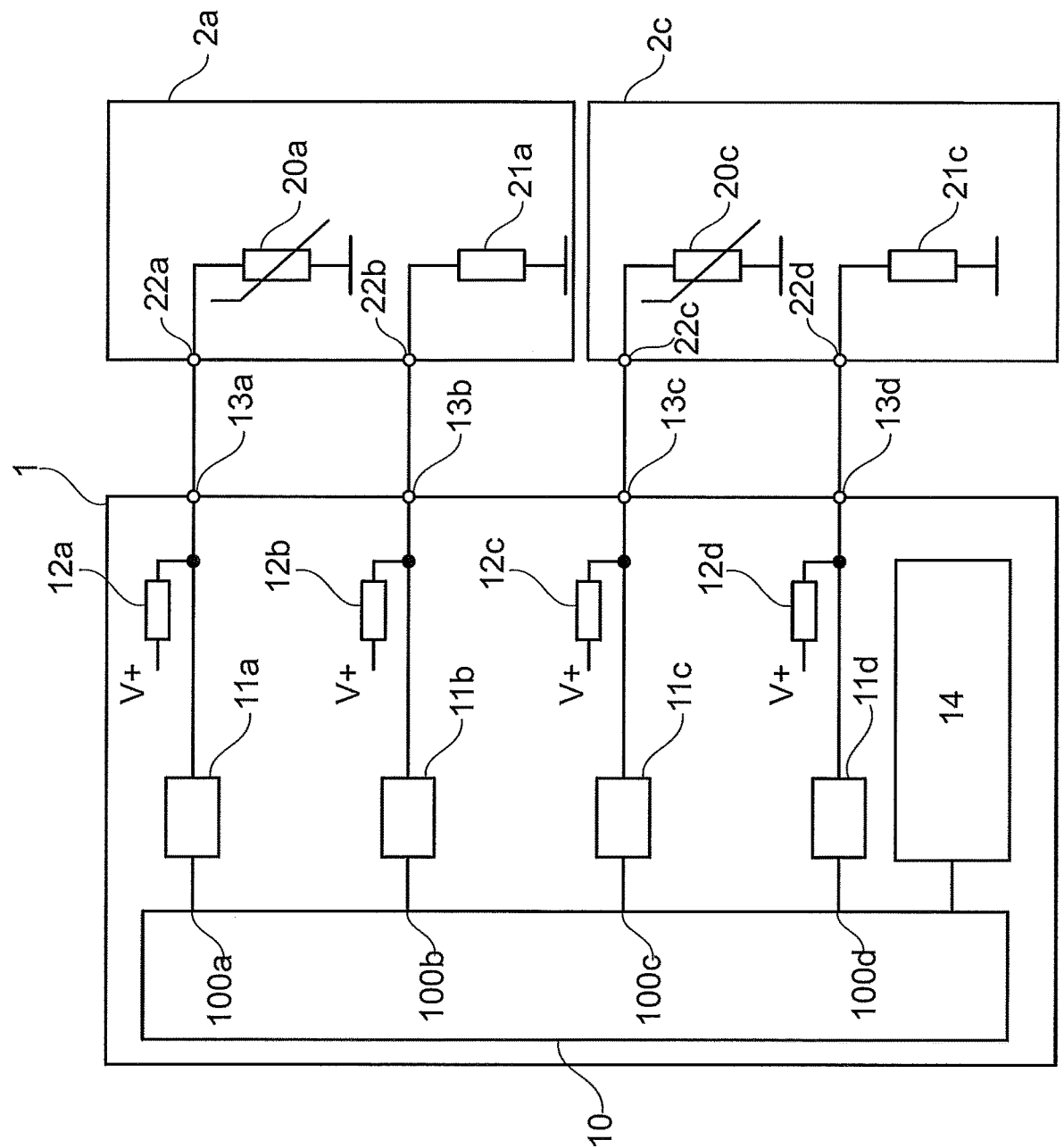

VEHICLE CONTROL DEVICE AND CONTROLLING LIGHTS

TECHNICAL FIELD OF THE INVENTION

The invention relates to a control device for lights, for example passenger vehicle lights, and particularly LED lights, having at least one input, wherein a coded resistor for the nominal power, the nominal current, and/or the nominal voltage of a light or of a lamp can be connected to said input, and having at least one input, wherein a passive temperature sensor, particularly a PTC or an NTC, can be connected to the same. The invention also relates to an arrangement of such a control device and at least one light.

BACKGROUND OF THE INVENTION

Lights which have, or are for, light-emitting diode lamps are increasingly being used in motor vehicles. Resistor components are frequently included in the lights or in the light equipped with the light-emitting diodes. One or more information sets for the lights or the light-emitting diodes used therein has been assigned to the ohmic resistance of such a resistor component. In principle, the assignment is arbitrary. If the classification is known, it is possible to figure out, using the resistance of the resistor component, what the light is suitable for and configured for, and/or how or to what it must be electrically connected.

Therefore, information is coded into the resistor components. For this reason, they are called coded resistors.

Light-emitting diodes and/or light-emitting diode means which are used in motor vehicles are classified into normed, so-called light classes, e.g., wherein certain electrical connector sizes of the light-emitting diodes and/or light-emitting diode lamps are assigned to each light class. In addition, information on the light class of a light can be saved in this light by means of coded resistors.

SUMMARY OF THE INVENTION

In the case of the control devices developed by the applicant, said control devices have inputs via which it is possible to determine the ohmic resistance of coded resistors of light-emitting diodes or light-emitting diode lamps, or lights having light-emitting diodes or light-emitting diode lamps, in order to acquire information on the light class of the lights controlled by the control device. The control device can then control the lights according to the light classes.

The same control devices have inputs to which passive temperature sensors (for example NTC resistors or PTC resistors) can be connected, by means of which it is possible to monitor the temperature in a light controlled by the control device.

The control device is conceived in such a manner that it can be used in different motor vehicles. Each motor vehicle for which the control device is suitable renders a number of inputs for coded resistors and a number of inputs for temperature sensors necessary, and these can be different from one motor vehicle to the next. In order to be suitable for the largest possible number of different types of vehicles, it is advantageous if numerous inputs for temperature sensors and numerous inputs for coded resistors are present. This requires a plurality of components and devices in the control device.

The invention therefore addresses the problem of improving a control device in the named class in such a manner that fewer components and devices are required in order to make it possible to use the control device in various different types of vehicles.

This problem is addressed according to the invention in that the inputs of the control device can be configured for both the connection of a coded resistor and for the connection of a passive temperature sensor. In the control device according to the invention, coded resistors alone, passive temperature sensors alone, or both of these can be connected to the control device.

A light in the context of the invention can be a module of a headlight.

The control device can have a microcontroller which is connected via analog to digital converters to the inputs. The inputs can be connected to a reference potential connector in the control device via pull-up resistors. It is likewise possible that a reference potential is tapped at the control device to which the coded resistor or the passive temperature sensor is connected. The coded resistor or the passive temperature sensor can then be connected to ground via an input of the control device and a pull-down resistor in the control device. During operation of the control device, a current can flow via the pull-up resistor or the pull-down resistor, and either the coded resistor or the passive temperature sensor, wherein the strength of said current is composed of the sum of the resistance values of the pull-up resistor and/or the pull-down resistor and the coded resistor and/or the passive temperature sensor. A voltage is created at the input, said voltage being created according to the voltage divider composed of the resistance values. According to the configuration of the input, the voltage can either be interpreted by the microcontroller as a light class, according to the coded resistor, or as a temperature, according to the resistance of the passive sensor.

The values for the coded resistors can be from 100 Ohm to 100 kOhm. However, a 0 Ohm resistor can also be contemplated, the same being implemented as a bridge. However, an infinite Ohm resistor can also be contemplated, the same being implemented as a line disconnection. The values for the passive resistors can be 100 Ohm to 200 kOhm, according to the sensor and the temperature.

The microcontroller can be suitable and configured for the purpose of further processing the voltage created at the input and received via an analog to digital converter, according to the configuration of the input, and of undertaking a control of the lights according to a program.

The control device can be programmable in order to determine a configuration of the input. The control device can have a storage device in which one or multiple configurations for the inputs can be saved, or is/are saved.

The control device can have an interface via which it is possible to read in and/or input a configuration of the inputs and/or an instruction to select a saved configuration of the inputs.

An arrangement according to the invention of a control device according to the invention and at least one light, for example a passenger vehicle light, and particularly an LED light, can be designed in such a manner that the at least one light has at least one coded resistor, in which the nominal power, the nominal voltage and/or the nominal current of one or multiple lamps for the light is/are coded. The at least one coded resistor can be connected to a first input of the inputs of the control device, and this first input can be configured for the connection of a coded resistor.

The at least one light, or a further light of the arrangement, can have a temperature sensor, and the at least one temperature sensor can be connected to a second input of the inputs of the control device, wherein the second input is configured for connection to a temperature sensor.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a schematic illustration of an arrangement according to the invention, having a control device according to the invention.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

The illustrated arrangement according to the invention has a control device 1 and two headlights 2a, 2c of a motor vehicle connected to the control device. Only the connections between the control device 1e [sic] and the headlights 2a, 2c are illustrated, these being of interest in the context of the invention. Additional connections between the control device 1 and the headlights 2a, 2c, for example for the purpose of controlling the headlights 2a, 2c, are not illustrated.

The control device can be included centrally in the vehicle for multiple lights. However, it is also possible to functionally assign the control device to one or several lights of the vehicle. In this case, multiple control devices according to the invention can be configured in the vehicle.

In addition, the components of the control device 1 and of the headlights 2a, 2c are illustrated which are of interest in the context of the invention.

The control device 1 has a microcontroller 10. The microcontroller 10 has four inputs 100a, 100b, 110c, 100d, which are connected via analog to digital converters to inputs 13a, 13b, 13c, 13d of the control device. The inputs 13a, 13b, 13c, 13d are connected to a positive reference potential $V_+$ of the control device 1 via resistors 12a, 12b, 12c, 12d. In addition, the control device 1 has a storage device 14.

The analog to digital converters could also be arranged outside of the control device. The analog to digital converters could also be a part of the microcontroller.

The inputs 13a, 13b are connected via connectors 22a, 22b of the upper of the two illustrated headlights 2a, 2c. The connector 22a is connected via an NTC resistor 20a to ground. The NTC resistor 20a is used as a temperature sensor in the headlight 2a. The electrical resistance of the NTC resistor 20a varies as the temperature of the headlights 2a changes.

The connector 22b is likewise connected via a resistor 21a to ground. The resistor 21a has a resistance value which represents one light class of the headlight. The resistor 21a is therefore also termed a coded resistor.

The inputs 13c, 13c [sic] are connected via connectors 22c, 22d of the lower of the two illustrated headlights 2a, 2c. The headlight 2c is constructed exactly as the uppermost of the illustrated headlights 2a in the context of the invention. The connector 22c is connected via an NTC resistor 20c to ground. The NTC resistor 20a is used as a temperature sensor in the headlight 2c. The connector 22d is likewise connected via a resistor 21c to ground. The resistor 21c is likewise a coded resistor.

The voltage divider consisting of the pull-up resistors 12a to d and the temperature sensors 20a, 20c and/or the coded resistors 21a, 21b regulates the electrical potential at the inputs 13a, 13b, 13c, 13d of the control device 1, said potential being created by a flow of current via this voltage divider from the positive reference potential V+ of the control device to the ground potential of the headlights, and being supplied to the microcontroller 10 via the analog to digital converters 11a to d. By utilizing this potential and the configuration of the inputs 13a to d saved in the control device 1, the microcontroller either determines the temperature or obtains information on the light class, these being required for the further processing in the control device.

Each of the inputs 13a to 13d of the control device can be connected [sic: configured] as an input for connection to a coded resistor or to a passive temperature sensor. The configuration is programmed in a software application in the microcontroller 10. The programming can be modified so that the control device 1 can be used in an arrangement according to the invention which has another topology. Various configurations of the inputs 13a to 13d are saved in the storage device 14, and can be loaded from there into the microcontroller.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE NUMBERS 1 control device
10 microcontroller
100a bis 100d inputs of the microcontroller
11a bis 11b analog to digital converter
12a bis 12d pull-up resistor
13a bis 13d inputs of the control device
14 storage device
2a, 2c headlights
20a, 20c passive temperature sensors
21a, 21c coded resistors
22a bis 22d connectors of the headlights

The invention claimed is:

1. A control device for lights, comprising:
at least one input;

wherein a respective first resistor is connected to each of said at least one input at a first end of each first resistor;
a ground voltage potential or a non-ground voltage potential connected to a second end of each first resistor, and thereby in electrical communication with each of said at least one input across said first resistor;
a microcontroller in electrical communication with each of said at least one input, and connected to said first end of each first resistor;
a storage device in communication with said microcontroller and electronically storing information regarding at least one possible configuration topology of whether one of a temperature sensor and a coded resistor is plugged into each of said at least one input;
wherein one of said configuration topologies is provided to said microcontroller; and
wherein said microcontroller is thereby operable to function with whichever of said temperature sensor and coded resistor is plugged into each of said at least one input.

2. The control device according to claim 1, further comprising an analog to digital converter, wherein said microcontroller is connected with said input via said analog to digital converter.

3. The control device according to claim 1, wherein said temperature sensor is one of a PTC resistor or an NTC resistor.

4. A control device for lights, comprising:
at least one input;
wherein a respective first resistor is connected to each of said at least one input at a first end of each first resistor;
a ground voltage potential or a non-ground voltage potential connected to a second end of each first resistor, and thereby in electrical communication with each of said at least one input across said first resistor;
a microcontroller in electrical communication with each of said at least one input, and connected to said first end of each first resistor;
a storage device in communication with said microcontroller and electronically storing information regarding at least one possible configuration topology of whether one of a temperature sensor and a coded resistor is plugged into each of said at least one input;
wherein a user provides one of said configuration topologies to said microcontroller; and
wherein said microcontroller is thereby operable to function with whichever of said temperature sensor and coded resistor is plugged into each of said at least one input.

5. The apparatus control device according to claim 4, wherein said coded resistor encodes at least one of the nominal power, the nominal voltage and the nominal current of at least one light.

* * * * *

UNITED STATES PATENT AND TRADEMARK OFFICE
CERTIFICATE OF CORRECTION

PATENT NO. : 10,813,181 B2
APPLICATION NO. : 13/827171
DATED : October 20, 2020
INVENTOR(S) : Ralf Edelmeier It is certified that error appears in the above-identified patent and that said Letters Patent is hereby corrected as shown below:

On the Title Page

In Item (54) and in the Specification, Column 1, Lines 1-2, delete "VEHICLE CONTROL DEVICE AND CONTROLLING LIGHTS" and replace with -- VEHICLE CONTROL DEVICE FOR CONTROLLING LIGHTS --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*